US007342646B2

(12) United States Patent
Shi et al.

(10) Patent No.: US 7,342,646 B2
(45) Date of Patent: Mar. 11, 2008

(54) METHOD OF MANUFACTURING RELIABILITY CHECKING AND VERIFICATION FOR LITHOGRAPHY PROCESS USING A CALIBRATED EIGEN DECOMPOSITION MODEL

(75) Inventors: Xuelong Shi, San Jose, CA (US); Jang Fung Chen, Cupertino, CA (US)

(73) Assignee: ASML Masktools B.V., Veldhoven (NL)

( * ) Notice: Subject to any disclaimer, the term of this patent is extended or adjusted under 35 U.S.C. 154(b) by 112 days.

(21) Appl. No.: 11/051,559

(22) Filed: Jan. 27, 2005

(65) Prior Publication Data

US 2005/0210437 A1    Sep. 22, 2005

Related U.S. Application Data

(60) Provisional application No. 60/539,991, filed on Jan. 30, 2004.

(51) Int. Cl.
G03B 27/32 (2006.01)
(52) U.S. Cl. ...................................... 355/77
(58) Field of Classification Search ................ 355/77, 355/52, 53, 55; 430/5, 30
See application file for complete search history.

(56) References Cited

U.S. PATENT DOCUMENTS

| 4,894,790 A | 1/1990 | Yotsuya et al. |
| 5,097,138 A | 3/1992 | Wakabayashi et al. |
| 5,307,296 A | 4/1994 | Uchida et al. |
| 5,307,421 A | 4/1994 | Darboux et al. |
| 5,319,564 A | 6/1994 | Smayling et al. |
| 5,416,729 A | 5/1995 | Leon et al. |
| 5,621,652 A | 4/1997 | Eakin |
| 5,795,688 A | 8/1998 | Burdorf et al. |
| 5,825,647 A | 10/1998 | Tsudaka |
| 5,966,312 A | 10/1999 | Chen |
| 6,046,792 A | 4/2000 | Van Der Werf et al. |
| 6,081,659 A | 6/2000 | Garza et al. |
| 6,289,499 B1 | 9/2001 | Rieger et al. |
| 6,563,566 B2 * | 5/2003 | Rosenbluth et al. .......... 355/67 |
| 2003/0082463 A1 * | 5/2003 | Laidig et al. .................. 430/5 |
| 2003/0082483 A1 | 5/2003 | Laidig et al. |
| 2003/0126581 A1 | 7/2003 | Pang et al. |
| 2003/0139833 A1 | 7/2003 | Pierrat et al. |

OTHER PUBLICATIONS

Pati Y. C, et al. "Exploiting Structure in Fast Aerial Image Computation for Integrated Circuit Patterns." IEEE Transactions on Semiconductor Manufacturing, Feb. 1997, IEEE, USA, vol. 10, No. 1, pp. 62-74, XP002256517.

(Continued)

*Primary Examiner*—Diane I. Lee
*Assistant Examiner*—Chia-how Michael Liu
(74) *Attorney, Agent, or Firm*—McDermott Will & Emery LLP

(57) ABSTRACT

A method for modeling a photolithography process which includes the steps of generating a calibrated model of the photolithography process capable of estimating an image to be produced by the photolithography process when utilized to image a mask pattern containing a plurality features; and determining an operational window of the calibrated model, which defines whether or not the calibrated model can accurately estimate the image to be produced by a given feature in the mask pattern.

12 Claims, 6 Drawing Sheets

OTHER PUBLICATIONS

Mack C A . et al. "Metrology, Inspection, and Process Control for Microlithography XV." Santa Clara CA, Feb. 26, 2001-Mar. 1, 2001, Vol. 4344, pp. 377-384, XP008022568.

Cobb N, et al. "Mathematical and CAD Framework for Proximity Correction."Optical Microlithography IX, Santa Clara, CA, Mar. 13-15, 1996, vol. 2726, pp. 208-222, XP008022569.

Crisalle et al., "A Comparison of the Optical Projection Lithography Simulators in SAMPLE and PROLITH", IEEE Transactions on Semiconductor Manufacturing, vol. 5, No. 1, Feb. 1992, pp. 14-26.

Gopalarao, et al., "An Integrated Technology CAD System for Process and Device Designers", IEEE Transactions on Very Large Scale Integration (VLSI) Systems, vol. 1, No. 4, Dec. 1993, pp. 482-490.

Neubauer, et al., "Imaging VLSI Cross Sections by Atomic Force Microscopy", 1992 IEEE/IRPS, pp. 299-303.

Rodgers, "Application of the Atomic Force Microscope to Integrated Circuit Reliability and Failure Analysis", 1991 IEEE/IRPS, pp. 250-254.

Qian et al., "A New Scaler Planewave Model for High NA Lithography Simulations", 1994 IEEE, pp. 45-48.

Barouch, et al. "Modeling Process Latitude in UV Projection Lithography", IEEE Electron Device Letters, vol. 12, No. 10, Oct. 1991, pp. 513-514.

Beacham, et al. "Applications of an Atomic Force Metrology System in Semiconductor Manufacturing", SPIE, vol. 1926, pp. 311-321.

"AFMs: What Will Their Role Be?", Semiconductor International, Aug. 1993, pp. 62-68.

Prolith/2 User's Manual, Finle Technologies, Version 3.0 for the Macintosh.

Danish Patent and Trademark Office, Danish Search Report, 2006.

* cited by examiner

METHOD OF MANUFACTURING RELIABILITY CHECKING AND VERIFICATION FOR LITHOGRAPHY PROCESS USING A CALIBRATED EIGEN DECOMPOSITION MODEL

This application claims the benefit of provisional application 60/539,991, filed on Jan. 30, 2004 and titled Method Of Manufacturing Reliability Checking And Verification For Lithography Process Using A Calibrated Eigen Decomposition Model, which is herein incorporated by reference in its entirety.

FIELD OF THE INVENTION

The field of the invention relates generally to a method, apparatus and program for utilizing models to simulate the aerial image resulting from a target mask pattern imaged by a given process, and more particularly relates to a method, apparatus and program product for verifying whether the features/structures of the target pattern can be accurately processed by the model (i.e., whether the features/structures of the target pattern are within an operational range (i.e., operational window) of the medel)) model).

BACKGROUND

Lithographic apparatus can be used, for example, in the manufacture of integrated circuits (ICs). In such a case, the photolithographic mask may contain a circuit pattern corresponding to an individual layer of the IC, and this pattern can be imaged onto a target portion (e.g. comprising one or more dies) on a substrate (silicon wafer) that has been coated with a layer of radiation-sensitive material (resist). In general, a single wafer will contain a whole network of adjacent target portions that are successively irradiated via the projection system, one at a time. In one type of lithographic projection apparatus, each target portion is irradiated by exposing the entire mask pattern onto the target portion in one go; such an apparatus is commonly referred to as a wafer stepper. In an alternative apparatus, commonly referred to as a step-and-scan apparatus, each target portion is irradiated by progressively scanning the mask pattern under the projection beam in a given reference direction (the "scanning" direction) while synchronously scanning the substrate table parallel or anti-parallel to this direction. Since, in general, the projection system will have a magnification factor M (generally <1), the speed V at which the substrate table is scanned will be a factor M times that at which the mask table is scanned. More information with regard to lithographic devices as described herein can be gleaned, for example, from U.S. Pat. No. 6,046,792, which is incorporated by reference herein in its entirety.

In a manufacturing process using a lithographic projection apparatus, a mask pattern is imaged onto a substrate that is at least partially covered by a layer of radiation-sensitive material (resist). Prior to this imaging step, the substrate may undergo various procedures, such as priming, resist coating and a soft bake. After exposure, the substrate may be subjected to other procedures, such as a post-exposure bake (PEB), development, a hard bake and measurement/inspection of the imaged features. This array of procedures is used as a basis to pattern an individual layer of a device, e.g. an IC. Such a patterned layer may then undergo various processes such as etching, ion-implantation (doping), metallization, oxidation, chemo-mechanical polishing, etc., all intended to finish off an individual layer. If several layers are required, then the whole procedure, or a variant thereof, will have to be repeated for each new layer. Eventually, an array of devices will be present on the substrate (wafer). These devices are then separated from one another by a technique such as dicing or sawing, whence the individual devices can be mounted on a carrier, connected to pins, etc. Further information regarding such processes can be obtained, for example, from the book Microchip Fabrication: A Practical Guide to Semiconductor Processing, Third Edition, by Peter van Zant, McGraw Hill Publishing Co., 1997, ISBN 0-07-067250-4, incorporated herein by reference.

For the sake of simplicity, the projection system may hereinafter be referred to as the "lens"; however, this term should be broadly interpreted as encompassing various types of projection systems, including refractive optics, reflective optics, and catadioptric systems, for example. The radiation system may also include components operating according to any of these design types for directing, shaping or controlling the projection beam of radiation, and such components may also be referred to below, collectively or singularly, as a "lens". Further, the lithographic apparatus may be of a type having two or more substrate tables (and/or two or more mask tables). In such "multiple stage" devices the additional tables may be used in parallel, or preparatory steps may be carried out on one or more tables while one or more other tables are being used for exposures. Twin stage lithographic apparatus are described, for example, in U.S. Pat. No. 5,969,441, incorporated herein by reference.

The photolithographic masks referred to above comprise geometric patterns corresponding to the circuit components to be integrated onto a silicon wafer. The patterns used to create such masks are generated utilizing CAD (computer-aided design) programs, this process is often being referred to as EDA (electronic design automation). Most CAD programs follow a set of predetermined design rules in order to create functional masks. These rules are set by processing and design limitations. For example, design rules define the space tolerance between circuit devices (such as gates, capacitors, etc.) or interconnect lines, so as to ensure that the circuit devices or lines do not interact with one another in an undesirable way. The design rule limitations are typically referred to as "critical dimensions" (CD). A critical dimension of a circuit can be defined as the smallest width of a line or hole or the smallest space between two lines or two holes. Thus, the CD determines the overall size and density of the designed circuit.

Of course, one of the goals in integrated circuit fabrication is to faithfully reproduce the original circuit design on the wafer (via the mask). As is known, optical proximity correction (QPC) features may be incorporated into the mask design to enhance the resulting image such that it more accurately represents the target pattern. Further, it is also known to utilize models of the desired process to simulate the aerial image of a given target pattern. Such models allow the operator to review the effects of adjusting masking features and OPC features on the resulting image without having to actually image a wafer, thereby saving both significant costs and time in the design process. One such modeling method is described in U.S. patent Application Ser. No. 10/981,750, filed on Nov. 5, 2004, which is hereby incorporated by reference in its entirety.

While such models exist, and the photolithography performance predicted from such a calibrated process model has proven quite satisfactory, the performance of the model deteriorates if either: (1) the features on the target pattern do not fall within the range of test structures utilized to calibrate the model, or (2) if the exposure tool does not remain in the same state as that when the model was calibrated. As is known, exposure tools are not static devices and their performance can change continuously due to fluctuations caused by both external environment and internal components. In view of the foregoing, it is of great interest and importance to develop a method which informs the operator whether or not the features on the target mask to be imaged fall within the "operational window" of the model, and which allows for the estimation of the photolithography performance from a calibrated model at the exposure tool states other than the calibration state (it is noted that the deviations of the exposure tool state from its calibration state can be either in exposure dose or in focus condition).

SUMMARY OF THE INVENTION

Accordingly, the present invention relates to a method of generating a model for simulating the image resulting from a mask pattern (also referred to as the target pattern) imaged by a given process, and a method for verifying whether the features/structures of the mask pattern can be accurately processed by the model (i.e., the features/structures of the mask pattern are within an operational range (also referred to as the operational window) of the model).

More specifically, the present invention relates to a method for modeling a photolithography process which includes the steps of generating a calibrated model of the photolithography process capable of estimating an image to be produced by the photolithography process when utilized to image a mask pattern containing a plurality features; and determining an operational window of the calibrated model, which defines whether or not the calibrated model can accurately estimate the image to be produced by a given feature in the mask pattern.

Importantly, the present invention may be used to model almost any type of illumination, such as top-hat illuminator, or customer designed illuminators or experimental or modeled illuminator profiles. The eigenfunctions utilized in the present invention may be from a scalar pupil function or from a vector indicative of high NA pupil functions. The process of the present invention may be in the form of an algorithm that can generate eigenfunctions for a generalized illuminator, whether it is a customer designed illuminator or a real illuminator measured from experiment. The present invention can also be utilized with a high NA model. The eigen decompostion model developed can also work with new low k1 photolithography technologies, such as Chromeless Phase Lithography (CPL) and Dipole Double Lithography (DDL).

The present invention provides important advantages over the modeling methods of the prior art. Most importantly, the method of the present invention allows the operator to verify that the model being utilized is accurate (i.e., within the operational window of the model) for the mask pattern for which the image is to be generated. In the event any of the features/structures of the mask pattern falls outside of the operational window of the model, a notification or flag is raised so as to alert the operator to confirm that the features/structures falling outside the operational window are printing within acceptable design tolerances. As the model has been extrapolated in such cases to obtain the estimated image, there is no guarantee that the predicted image results are accurate.

In addition, the present invention also provides for a method for estimating the photolithography performance from a calibrated model at exposure tools states other than the state at which the model was calibrated.

Additional advantages of the present invention will become apparent to those skilled in the art from the following detailed description of exemplary embodiments of the present invention.

Although specific reference may be made in this text to the use of the invention in the manufacture of ICs, it should be explicitly understood that the invention has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as being replaced by the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range 5-20 nm).

The term mask as employed in this text may be broadly interpreted as referring to generic patterning means that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning means include:

a programmable mirror array. An example of such a device is a matrix-addressable surface having a viscoelastic control layer and a reflective surface. The basic principle behind such an apparatus is that (for example) addressed areas of the reflective surface reflect incident light as diffracted light, whereas unaddressed areas reflect incident light as undiffracted light. Using an appropriate filter, the said undiffracted light can be filtered out of the reflected beam, leaving only the diffracted light behind; in this manner, the beam becomes patterned according to the addressing pattern of the matrix-addressable surface. The required matrix addressing can be performed using suitable electronic means. More information on such mirror arrays can be gleaned, for example, from U.S. Pat. No. 5,296,891 and U.S. Pat. No. 5,523,193, which are incorporated herein by reference.

a programmable LCD array. An example of such a construction is given in U.S. Pat. No. 5,229,872, which is incorporated herein by reference.

The invention itself, together with further objects and advantages, can be better understood by reference to the following detailed description and the accompanying schematic drawings.

BRIEF DESCRIPTION OF THE DRAWINGS

The accompanying drawings, which are incorporated in and form a part of the specification, together with the description serve to explain the principles of the invention. In the drawings.

DETAILED DESCRIPTION OF THE INVENTION

Figure 1:
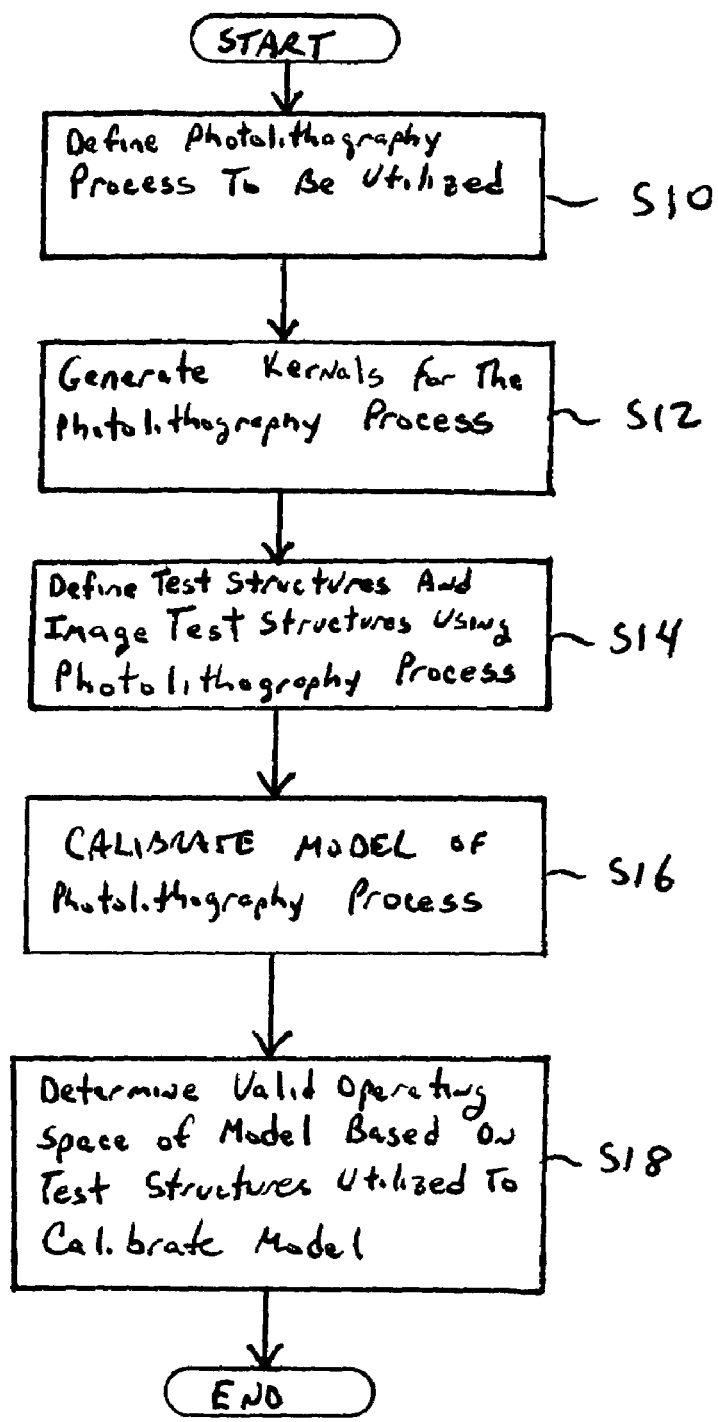
FIG. 1 illustrates a flowchart depicting an exemplary method of the present invention.

Disclosed is a method and apparatus for verifying that a calibrated model is suitable for use with a given mask pattern. It is noted that the exemplary method detailed below utilizes an eigen function decomposition model (referred to as an Eigen Decomposition Model, or EDM), for modeling the performance of the imaging process. However, it is also possible to utilize the methods of the present invention with other types of models.

Prior to discussing the method of the present invention, a brief discussion regarding the generation of an eigen decomposition model is presented. A more detailed description of the generation of the eigen decomposition model can be found in U.S. patent application Ser. No. 10/981,750 filed on Nov. 5, 2004, as noted above.

As noted, in the following example illustrating the method of the present invention, a constant threshold eigen decomposition model is utilized. A constant threshold eigen decomposition model is premised on several fundamental theorems. The first is that any 2D binary image can be obtained by cutting a band limited real valued function at a constant threshold. The second is that the aerial image from an optical image system is a band limited function, and therefore, the effective degrees of freedom of the aerial image are finite. The third is that the optimal basis functions for describing the aerial image are the eigen functions, which can be solved utilizing an integral equation whose operator is determined by the optical image system setting.

Under partial coherent illumination conditions that are typically used in semiconductor manufacturing, the optical imaging system itself is nonlinear in character. The aerial image, i.e. the light intensity distribution at the image plane, from any given mask pattern, can be readily calculated rather accurately using well-known formulas in optics, see for example, H. H. Hopkins, Proc. Roy. Soc., A, 217 (1953), 408, herein incorporated by reference. The response of chemically amplified resist to light intensity and the subsequent resist development in solvent are all very nonlinear. The final developed pattern on a wafer can be viewed as binary, either with resist or without resist on top of the wafer substrate. The main function of the model is to provide a mathematical formula that can predict the binary image on the wafer from the mask pattern or the aerial image accurately. Stated mathematically, $$T(x,y)=F(M(x,y)) \quad (1)$$

where $T(x,y)$ is the produced binary image on the wafer, and $M(x,y)$ is the input pattern on the mask (which can include OPC features). F represents the unknown functional form, which is the core of any model. In the simplest constant threshold model, the binary image is achieved by cutting the aerial image of $M(x,y)$ using a constant threshold. It is noted that the binary image obtained by cutting the aerial image at a constant threshold does not typically fully agree with the experimental result due to the finiteness of the resist contrast. The simplicity in obtaining the binary image using a constant threshold, however, is very attractive. There exists a mathematical theorem which states any binary function $T(x,y)$, whose value is either 0 or 1, can be obtained by thresholding a band-limited continuous function $F(x,y)$ to any specified accuracy. The higher the required accuracy, the larger the required bandwidth of the function $F(x,y)$. Such a continuous function $F(x,y)$ is termed a system pseudo intensity function (SPIF) in the model of the present invention.

In other words, in the eigen decomposition model the object is to identify a transformation function that relates the aerial image to another band limited non-negative real valued function from which a desired binary image can be achieved by thresholding the non-negative real value function at certain value. The new band limited non-negative real valued function is referred to as a system pseudo intensity function (SPIF).

The transformation from the aerial image $I(x,y)$, which can be readily calculated, to SPIF constitutes a key element in the model. The value of SPIF at location $(x,y)$ depends not only on the value of aerial image intensity at $(x,y)$, but also on all the values of the aerial image intensity around point $(x,y)$. Mathematically, the SPIF can be expressed as, $$SPIF(x,y)=G(I(x,y)) \quad (2).$$

Due to the complicated nature of the photolithography process, it is unlikely to derive an exact functional form of G based on first physical principles. As such, an approximate functional form of G is utilized. This is possible only if the aerial image $I(x,y)$ has finite effective degrees of freedom, which is true according to Shanon's sampling theorem, since the aerial image $I(x,y)$ is a band-limited function, as discussed in C. E. Shannon, Proc. IRE, 37, (1946), 429, herein incorporated by reference.

An overview of a first exemplary embodiment of the invention is illustrated in FIG. 1. In the first step of the process, Step 10, the photolithography process to be utilized is defined. Next, in Step 12, a set of kernels (i.e., the model) of the photolithography process is generated. In the given embodiment, an eigen decomposition model of the photolithography process is generated. Thereafter, in Step 14, a plurality of test structures are subjected to an actual imaging process utilizing the same photolithography process utilized to generate the set of kernels. In Step 16, the model is calibrated. This is accomplished by inputting the test structures into the model and then comparing the results of the model to the actual imaging results produced in Step 14. The model is then adjusted until the imaging results produced by the model match the actual imaging results within a predetermined error tolerance. As would be known by those of skill in the art, the predetermined tolerance would vary in accordance with the specific application and photolithography tools being utilized. Once the model is tuned so as to be within the predefined error tolerance, the model is deemed calibrated.

Next, in Step 18, utilizing the calibrated model, evaluation points for the various test structures utilized to calibrate the model are utilized to determine the valid operating space of the model. For example, for each test structure, evaluation points may be defined along the two-dimensional boundary of the test structure at predetermined intervals (e.g., 50 nm intervals). By quantifying the test structures at these evaluation points it is possible to define the operating space in which the model is valid. More specifically, as the foregoing process has already confirmed that the model processes these test structures within an acceptable error tolerance, any structure subsequently processed by the model that falls within this operating space (i.e., operational window) will also be accurately represented by the simulated image generated by the model. It is noted that there are numerous methods of quantifying the valid operating space of the model, and the present invention should not be deemed limited to the examples disclosed below.

Figure 2:
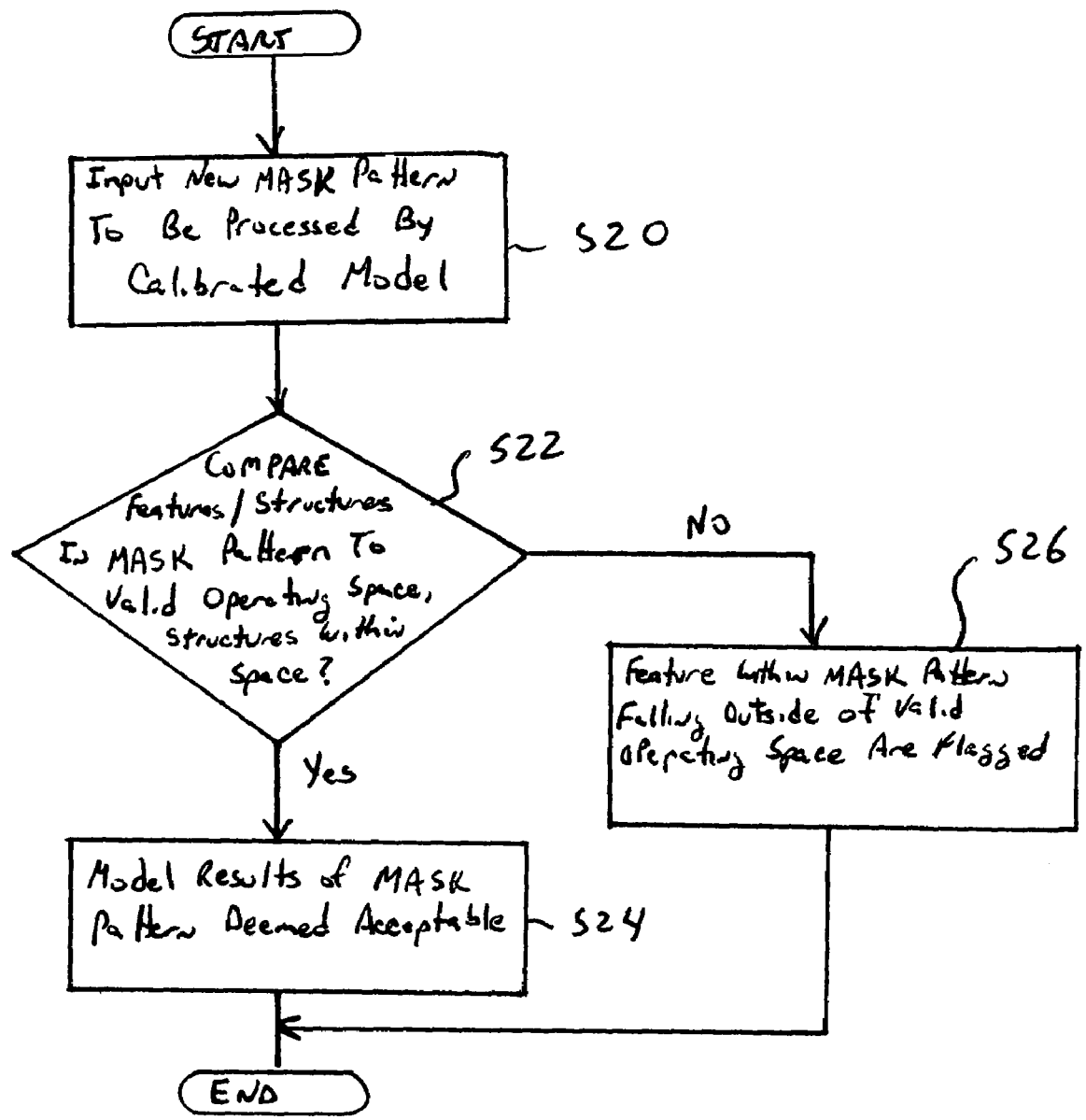
FIG. 2 illustrates a flowchart depicting an exemplary process of confirming whether or not mask patterns are within the operational window of the calibrated model.

Referring to FIG. 2, once the valid operating space (i.e., operational window) of the calibrated model is defined or quantified, when new mask data or new mask structure is to be operated on by the model, Step 20, the structures in the new mask design are first analyzed, Step 22, to determine whether or not the new structures fall within the valid operating space of the model. If the structures fall within the valid operating space, the results of the model are deemed acceptable and do not require further attention by the operator, Step 24. However, if the new structures are determined to fall outside of the valid operating space of the model, the structures that fall outside of the valid operating space will be automatically flagged and identified, Step 26, so as to notify the operator that further analysis of the identified/flagged structures may be necessary to confirm the printing results produced by the model are accurate. It is noted that for a given mask design, some structures are likely to fall within the valid operating space of the model, while some structures may fall outside the valid operating space of the model. The method of the present invention preferably allows each structure to be individually flagged so that the operator can analyze those structures falling outside the valid operating space on a structure by structure basis, and even on a location by location basis.

Figure 3:
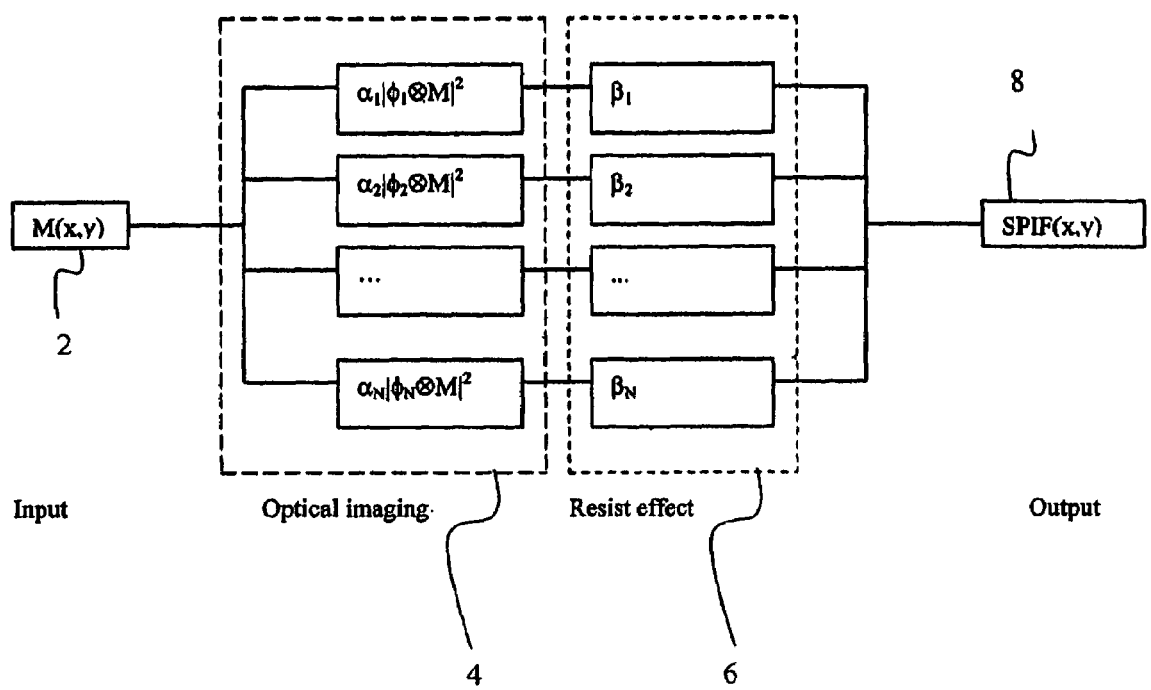
FIG. 3 illustrates an exemplary eigen decomposition model (e.g., a first order eigen decomposition model).
Figure 4:
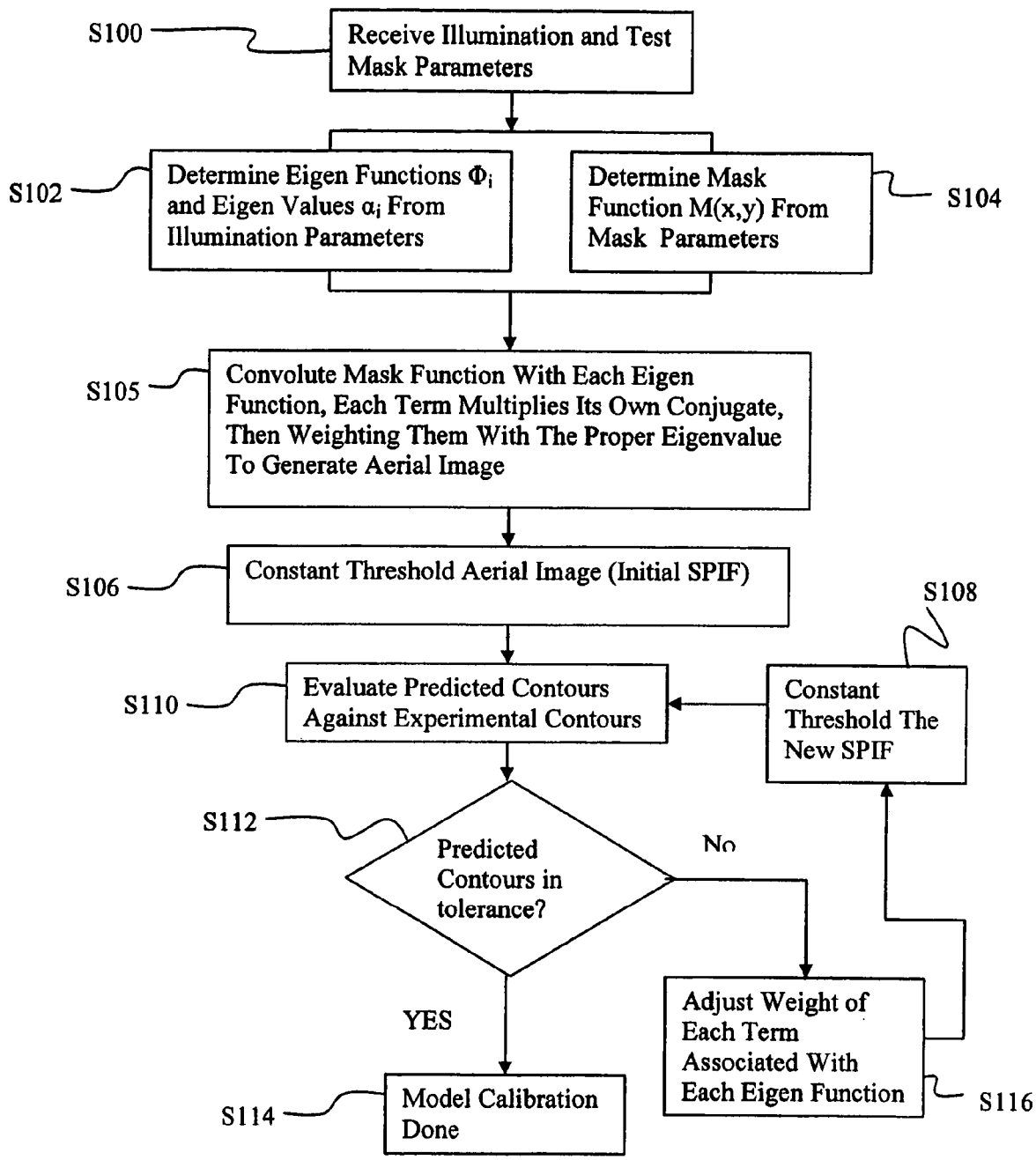
FIG. 4 illustrates an exemplary process for generating a calibrated eigen decomposition model.

FIGS. 3 and 4 illustrate a more detailed explanation of the model calibration process referred to in FIG. 1. Referring to FIGS. 3 and 4, an input 2 containing characteristics of the mask pattern is provided to an optical imaging model 4, step S100. Eigen functions and eigen values representing the imaging process are determined from characteristics of the illumination source and imaging process to be utilized including, for example, the numerical aperture NA and the wavelength λ, step S102. The characteristics of test mask (i.e., the test structures) are used to determine a mask function M(x,y), step S104, which is provided as input 2. The aerial image is determined by convoluting the eigen functions with the mask function M(x,y), step S105. A first order eigen function indicative of the resist effect 6 may be utilized in determining the aerial image to account for the effect a particular resist has on the actual aerial image. A predetermined constant threshold is applied to the aerial image to generate an initial SPIF with predicted contours, step S106. The predicted contours are compared to known contours of the test mask, which are determined by actually printing the test mask image using the same illumination conditions and process, step S110. If the predicted contours are within a predetermined error tolerance of the measured contours, step S112 YES (it is noted that in the preferred embodiment, 2-dimensional counters are utilized in the comparison process), then the predictive model is certified as being an accurate model and the model calibration is complete, step S114. If the predicted contours are not within a predetermined error tolerance, step S112 NO, then the weight of each term associated with each eigen function, which define the imaging process, is adjusted, step S116 and a new SPIF is produced. Then, a constant threshold is applied to the new SPIF, step S108, and the process in steps S108-116 is repeated until a model is produced which provides contours within the predetermined error tolerance.

In determining the eigen functions and eigen values, as illustrated in step S102 of FIG. 4, a set of parameters indicative of the characteristics of the optical imaging system are provided as one or more basis functions of generally the same bandwidth. An optimal basis function among all the possible sets of basis functions with bandwidth Ω may be determined using a decomposition technique. By the optimal set of basis functions, it is meant that the number of the basis functions that are needed from the set is minimum to approximate any real valued function of bandwidth Ω for any specified error requirement. Preferably, such an optimal set of basis functions must represent the optical imaging system (illumination, pupil, etc.) most effectively, and be independent of the object to be imaged. Starting from the imaging formula of Hopkin's in the scalar regime:

$$I(x, y) = \int_{-\infty}^{\infty}\int_{-\infty}^{\infty}\int_{-\infty}^{\infty}\int_{-\infty}^{\infty} \gamma(x_1 - x_2, y_1 - y_2) K(x - x_1, y - y_1) K^*(x - x_2, y - y_2) M(x_1, y_1) M^*(x_2, y_2) dx_1 dy_1 dx_2 dy_2 \qquad (3)$$

where $\gamma(x_2-x_1, y_2-y_1)$ is the mutual coherence between $(x_1, y_1)$ and $(x_2, y_2)$ at the object plane, which is determined by illumination, and $K(x-x_1, y-y_1)$ is the impulse response function of the optical imaging system, which is determined by the pupil function of the optical system. More explicitly, $K(x-x_1, y-y_1)$ is the complex amplitude at the point $(x, y)$ in the image plane, due to a disturbance of unit amplitude and zero phase at $(x_1, y_1)$ in the object plane. $M(x_1, y_1)$ is the complex transmission of the object at point $(x_1, y_1,)$. A variable with asterisk refers to the conjugate of the variable, for example, $K^*$ is the conjugate of $K$ and $M^*$ is the conjugate of $M$.

Equation (3) can be written in another form by changing the integration variables, $$I(x, y) = \int_{-\infty}^{\infty}\int_{-\infty}^{\infty}\int_{-\infty}^{\infty}\int_{-\infty}^{\infty} \gamma(x'_2 - x'_1, y'_2 - y'_1) K(x'_1, y'_1) K^*(x'_2, y'_2) M(x - x'_1, y - y'_1) M^*(x - x'_2, y - y'_2) dx'_1 dy'_1 dx'_2 dy'_2 \qquad (4)$$

Let $$W(x'_1, y'_1; x'_2, y'_2) = \gamma(x'_2 - x'_1, y'_2 - y'_1) K(x'_1, y'_1) K^*(x'_2, y'_2) \qquad (5)$$

since $$\gamma(x'_2 - x'_1, y'_2 - y'_1) = \gamma^*(x'_1 - x'_2, y'_1 - y'_2) \qquad (6)$$

One has $$W(x'_1, y'_1; x'_2, y'_2) = W^*(x'_2, y'_2; x'_1, y'_1) \qquad (7)$$

The integral operator W that satisfies the relation of equation (7) is called hermitian operator. According to the Mercer's theorem (described in A. V. Balakrishnan, Applied Functional Analysis, (1976)), for a hermitian operator, there exists a complete set of orthonormal functions $\{\phi i\}$ such that W can be expanded onto $\{\phi_i\}$ diagonally, $$W(x'_1, y'_1; x'_2, y'_2) = \sum_{i=1}^{\infty} \alpha_i \phi_i(x'_1, y'_1) \phi_i^*(x'_2, y'_2) \qquad (8)$$

An integral equation can be easily obtained from equation (8) by first multiplying $\phi_i(x_2',y_2')$ on both sides, and then integrating over variables $x_2$ and $y_2$ on both sides. Since $\{\phi_j\}$ is orthonormal, the only term that survives on the right side after integration is the term with j=i.

$$\iint W(x_1',y_1';x_2',y_2')\phi_i(x_2',y_2')dx_2'dy_2'=\alpha_i\phi_i(x_1',y_1') \quad (9)$$

The orthonormal functions $\{\phi_i\}$ are the eigen functions of the integral operator W, which can be readily obtained through solving the integral equation (9), and $\{\alpha_i\}$ are the corresponding eigen values. As provided in equations (4) and (5), the integral operator W is also positive and semi-definite, because the aerial image intensity I(x,y) at any location (x,y) is nonnegative for any given input mask pattern M(x,y). This condition imposes further restrictions on the values of $\{\alpha_i\}$, that they must be nonnegative and bounded. It is always possible to order the eigen functions $\{\phi_i\}$ according to their eigen values $\{\alpha_i\}$ such that $\alpha_1 \geq \alpha_2 > \alpha_3 \geq \ldots >0$. Degenerate functions can arise if the illumination and the pupil function possess certain symmetries. Degenerate functions refer to functions that possess the same eigen value.

As illustrated by step S105 of FIG. 4, the aerial image is calculated by the convolution of the mask function M(x,y) with the eigen functions. More particularly, with an orthonormal set of functions $\{\phi_i\}$, the aerial image can be calculated using the following equation by inserting equation (8) into equation (4).

$$I(x, y) = \sum_{i=1}^{\infty} \alpha_i |\phi_i \otimes M|^2 \quad (10)$$

where represents the convolution operation between the eigen function $\phi_i$ and the mask transmission function M. In the language of imaging theory, equation (10) shows that a partially coherent imaging system can be decomposed into a series of coherent imaging systems. Although there are other methods to decompose a partially coherent imaging system into a series of coherent imaging systems, the method described above has been proven to be an optimal one, often called optimal coherent decomposition. See, for example, Y. C. Pati and T. Kailath, J. Opt. Soc. Am. A11, (1994), 2438, herein incorporated by reference. Accordingly, the optimal coherent decomposition technique described by equation 10 is preferably used in the optical imaging model 4.

Any number of kernels (transmission channels) for the aerial image of $\phi_{1-N}$ may be used as illustrated in FIG. 3. However, for most currently employed illuminations in semiconductor manufacturing, only the first few transmission channels are significant. It is noted that the recorded signal from the ith channel is not the complex amplitude $\phi_i M$, but the intensity $|\phi_i M|^2$. There exist no cross terms $(\phi_i M)(\phi_j M)^*(i \neq j)$, because the complex amplitudes from different channels bear no correlation at all in phase, and their averaged values over time are zero. In other words, in the model of the present invention and utilized herein, the basic signals are intensity-like $\{|\phi_i M|^2\}$, not electric field-like $\{\phi_i M\}$.

After the significant signals are determined, the SPIF is determined as illustrated in step S106. Particularly, with the eigen decomposition method of the present invention, it is possible to obtain an effective and accurate way to describe the aerial image intensity distribution around a point of interest (x, y). Denoting the signal from ith channel as $S_i$, $$S_i = \alpha_i |\phi_i M|^2 \quad (11)$$

then the functional form G in equation (2), which represents the transformation from the aerial image I(x,y) into the SPIF(x,y), can be expressed as:

$$SPIF(x,y) = G(S_1(x,y), S_2(x,y), \ldots S_N(x,y)) \quad (12)$$

Here the assumption has been made that only the signals from the first N channels are significant. Since the exact functional form that describes the dependence of SPIF on $\{S_i\}$ is unknown, a successive correction approach is taken. This approach is based on the fact that the contours predicted from thresholding the aerial image using a constant threshold are in fair agreement with those from experiments, even though the agreements are not quantitatively satisfactory. It is therefore expected that a series expansion should serve the purpose to correct the deviation of SPIF from its original aerial image I(x,y).

$$SPIF(x, y) = \sum_{i=1}^{N} \beta_i S_i(x, y) + \sum_{i=1}^{N} \sum_{j=1}^{N} \eta_{ij} S_i(x, y) S_j(x, y) + \ldots \quad (13)$$

The coefficients account for the effect of resist, they also include the effects of other "non ideal" factors such as topography on masks.

As noted above, contours of the predicted SPIF are compared to experimentally determined contours produced by a test pattern, step S112. If the predicted contours are within a predetermined tolerance of the experimentally determined contours, then the model calibration is complete, step S114. However, if the predicted contours are not within the predetermined tolerance, then the weight of each term associated with each eigen vector is adjusted, step S116, and a new SPIF is produced according to the principles discussed above. The constant threshold is applied to the new SPIF, step S108, and the process in steps S108-116 repeats until the model calibration is complete or a predetermined number of attempts have been tried.

If only the first order terms are preserved, then the model is first order, and the bandwidth of SPIF is the same as its original aerial image determined by the optical imaging system. When the first order model is not accurate enough, second order terms can be included in the model to generate a second order model. The second order model will have a bandwidth that is twice as that of the original aerial image. The degree of freedom in a first order eigen decomposition model is N, specified by $\{\beta_1, \beta_2, \ldots \beta_N\}$. The degree of freedom in a second order eigen decomposition model is N+N(N+1)/2, due to the symmetry of the coefficients $\{\eta_{ij}\}$. The first order eigen decomposition model is depicted in FIG. 3.

As noted above, once the model calibration is completed, or alternatively during the model calibration process, the valid operating space of the calibrated model is also determined. One example of how to define the valid operating space (i.e., operational window) of the model is as follows. The first step in the process is to quantify each of the test structures utilized in the model calibration. This is accomplished by utilizing the signals generated by Eq. 11 above. Assuming only three kernels (channels) are necessary to achieve the desired accuracy, for each given test structure, evaluation points are defined and sampled utilizing Eq. 11.

Typically, the evaluation points are taken along the polygon edge of the test structure at predetermined intervals. Assuming the evaluation points for a given test structure are 1, 2, ..... N, a set of signals (S1, S2, S3), or more explicitly:

$$\{S1^1, S2^1, S3^1\}; \{S1^2, S2^2, S3^2\}; \{S1^3, S2^3 S3^3\}; \ldots \\ \{S1^N, S2^N, S3^N\};\quad (14)$$

where the subscript is the signal label (i.e., the signal for the ith kernel), and the superscript is the evaluation point label, are calculated utilizing Eq. 11. The signals generated by Eq. 11 for all the evaluation points of all the test structures define the region or operating space {S1,S2,S3} within which the model is confirmed valid. It is noted that a set of signals {S1, S2, S3} are computed for each of the test structures utilized in the calibration process. To elaborate further, assuming a first order model is to be utilized, in this case, the signals from all the test structures define the boundaries for each signal axis respectively, namely, $[S_1,\min, S_1,\max]$, $[S_2,\min, S_2,\max]$, $[S_3,\min, S_3,\max]$. Using the same Eq. 11, signals can be calculated for an incoming mask pattern at evaluation points with a predefined interval, for each signal, S1, S2, and S3, and these signals can be compared against the corresponding boundaries set by the test structure signals (corresponding to the test structures utilized to calibrate the model).

Once the valid operating space of the calibrated model is defined, as explained above in conjunction with FIG. 2, when subjecting the new structures (i.e., new mask design) to the model, the new structures are analyzed to determine if the new structures fall within the valid operating space of the model. If any of the new structures do not fall within the valid operating space of the model, the model predicts the imaging results for these new structures by extrapolating the calibrated model. However, the system also flags these new structures to alert the operator that the predicted imaging results for these new structures could be incorrect, as the new structures did not fall within the confirmed valid operating space of the model.

As noted above, the present invention also provides for a method for estimating the photolithography performance from a calibrated model at exposure tools states other than the state at which the model was calibrated.

Typically, an eigen decomposition model is calibrated at a fixed process condition, most notably, at a fixed exposure dose and focus setting. When the exposure dose is changed, the signals received by the resist change proportionally. If the exposure dose used for calibration is $E_0$, then the SPIF function with exposure dose $kE_0$ is:

$$SPIF(x, y; Z = Z_0; E = kE_0) = \quad (15)$$
$$k\sum_{i=1}^{N}\beta_i S_i(x,y) + k^2 \sum_{i=1}^{N}\sum_{j=1}^{N}\eta_{ij} S_i(x,y)S_j(x,y) + \ldots$$

Here the focus setting is assumed to be the same as the one used in calibration. The binary image at exposure doses other than the calibration exposure dose can therefore be readily obtained by cutting the SPIF function, as expressed in equation (15), with the exact same threshold.

More specifically, assuming that the optimal basis functions for the process at the calibration focus condition are $\{\phi_i; Z=Z_0\}$, and the optimal basis functions for the process at other focus condition are $\{\psi_n; Z=Z_m\}$, since defocus does not change the bandwidth of the signals from an optical imaging system provided all other conditions are kept the same, an aerial image with focus $Z=Z_m$ can be decomposed either into $\{\psi_n; Z=Z_m\}$ or into $\{\phi_i; Z=Z_0\}$. The sole difference between $\{\psi_n; Z=Z_m\}$ and $\{\phi_i; Z=Z_0\}$ is their efficiencies in representing the aerial image, i.e., the minimum number of functions required to represent the aerial image for a specified error tolerance. In other words, $\{\psi_n; Z=Z_m\}$ and $\{\phi_i; Z=Z_0\}$ are just two different representations for the aerial image from that optical imaging system. This is so because both $\{\psi_n; Z=Z_m\}$ and $\{\phi_i; Z=Z_0\}$ are complete set of basis functions and possess the same bandwidth. If the representation of an aerial image is known in one set of the basis functions, its representation in other sets of basis functions can easily be obtained. It is therefore only necessary to calibrate the process at one focus condition.

Assuming the parameters that characterize the process following exposure are $\{\beta_i\}$ and $\{\eta_{ij}\}$ at focus $Z=Z_0$, one has:

$$SPIF(x, y; Z = Z_0; E = E_0) = \quad (16)$$
$$\sum_{i=1}^{N}\beta_i S_i(x, y) + \sum_{i=1}^{N}\sum_{j=1}^{N}\eta_{ij} S_i(x,y)S_j(x,y) + \ldots$$

where:

$$S_i = \alpha_i |\phi_i \otimes M|^2 \quad (17)$$

At the focus $Z=Z_m$; one has:

$$S'_n = \alpha'_n |\psi_n \otimes M|^2 \quad (18)$$

Since $\{\phi_i\}$ is complete, one can express $\{\psi_n\}$ in terms of $\{\phi_i\}$:

$$\Psi_n = \sum_i \chi_i^n \phi_i \quad (19)$$

Inserting (19) into (18), one has:

$$S'_n = \alpha'_n |\Psi_n \otimes M|^2 \quad (20)$$
$$= \alpha'_n \left(\sum_{i=1}^{} \chi_i^n \phi_i \otimes M\right)\left(\sum_{t=1}^{} \chi_t^n \phi_t \otimes M\right)^*$$
$$= \alpha'_n \sum_i |\chi_i^n|^2 |\phi_i \otimes M|^2 + \alpha'_n \sum_{i \ne t} \chi_i^n (\chi_t^n)^* (\phi_i \otimes M)(\phi_t \otimes M)^*$$
$$= \frac{\alpha'_n}{\alpha_i} \sum_{i=1}^{} |\chi_i^n|^2 S_i$$

where:

$$\chi_i^n = \int\int \Psi_n \cdot \phi_i^* dx dy \quad (21)$$

The second term in (20) vanishes, because the fields $(\phi_i M)$ and $(\phi_t M)^*$ bear no correlation in phase, and the time averaged value therefore becomes null.

Since the effective degree of freedom of the aerial image is finite, and one can assume the required number of signals is N in $\{\phi_i\}$ representation, and M in $\{\psi_n\}$ representation, the total signal from ith channel in the representation of $\{\phi_i\}$ from an aerial image at defocus condition is:

$$\sum_{n=1}^{n=M} \frac{\alpha'_n}{\alpha_i} |\chi_i^n|^2 S_i \qquad (22)$$

And accordingly, the SPIF at defocus $Z=Z_m$ is:

$$SPIF(x, y; Z = Z_m; E = E_0) = \sum_{i=1}^{N} \beta_i \left( \sum_{n=1}^{n=M} \frac{\alpha'_n}{\alpha_i} |\chi_i^{n_i}|^2 S_i \right) + \qquad (23)$$

$$\sum_{i=1}^{N} \sum_{j=1}^{N} \eta_{ij} \left( \sum_{n=1}^{n=M} \frac{\alpha'_n}{\alpha_i} |\chi_i^{n_i}|^2 S_i \right) \left( \sum_{n=1}^{n=M} \frac{\alpha'_n}{\alpha_j} |\chi_j^{n_j}|^2 S_j \right) + \ldots$$

If both defocus and exposure dose are considered, then the SPIF becomes:

$$SPIF(x, y; Z = Z_m; E = kE_0) = k \sum_{i=1}^{N} \beta_i \left( \sum_{n=1}^{n=M} \frac{\alpha'_n}{\alpha_i} |\chi_i^{n_i}|^2 S_i \right) + \qquad (24)$$

$$k^2 \sum_{i=1}^{N} \sum_{j=1}^{N} \eta_{ij} \left( \sum_{n=1}^{n=M} \frac{\alpha'_n}{\alpha_i} |\chi_i^{n_i}|^2 S_i \right) \left( \sum_{n=1}^{n=M} \frac{\alpha'_n}{\alpha_j} |\chi_j^{n_j}|^2 S_j \right) + \ldots$$

Since $\{\beta_i\}$ and $\{\eta_{ij}\}$ are known by calibrating the model with experimental data at focus $Z=Z_0$, and all the other quantities in equation (24) can be calculated, the SPIF can therefore be obtained. As a result, the binary images at conditions other than the calibration condition can be readily achieved by the cutting the SPIF as expressed in equation (24) using the exact same threshold as the one used in calibration.

Figure 5:
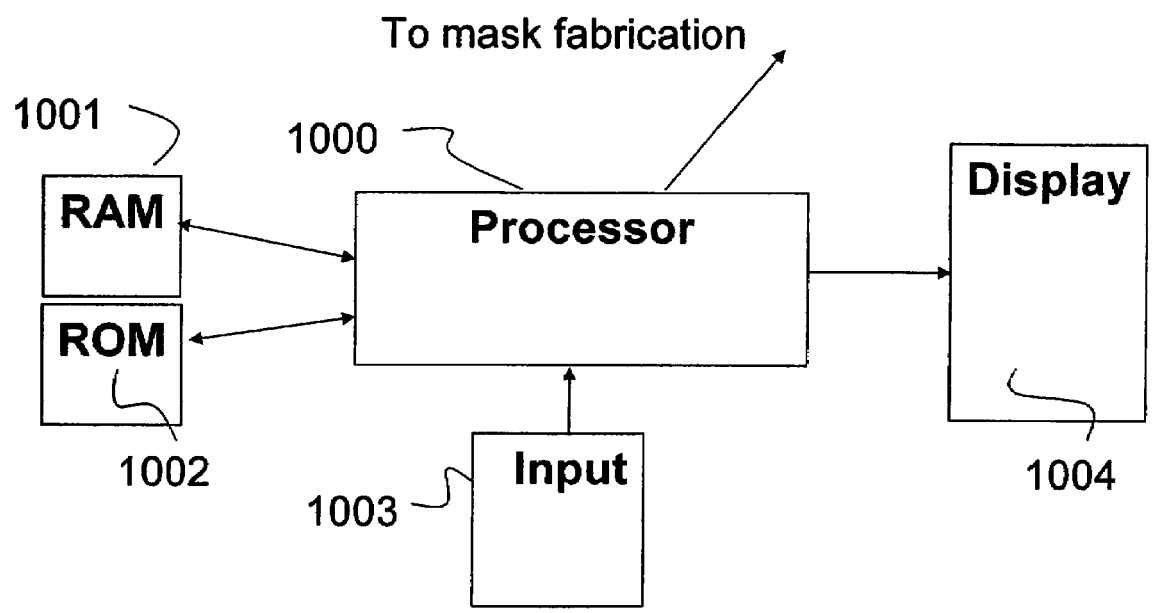
FIG. 5 illustrates an exemplary processing system for implementing the present invention.

FIG. 5 illustrates an exemplary processing system for implementing the eigen decomposition models illustrated in FIGS. 1-4. As illustrated in FIG. 5, an exemplary mask optimization unit may contain a processor 1000 which receives input from an input 1003. Processor 1000 may be a conventional microprocessor or may be a specially designed processing unit, such as an EEPROM or EPROM or a fabricated integrated circuit. Input 1003 may be any type of electronic input device, such as a keyboard or a mouse, or may be a memory or internet connection. Processor 1000 preferably retrieves stored protocols from ROM 1002 and RAM 1001, such as protocols to implement the processing illustrated in FIGS. 1-4, and stores information on RAM 1001. The calculated results of processor 1000 may be displayed on display 1004 and may be provided to a mask fabrication unit.

Figure 6:
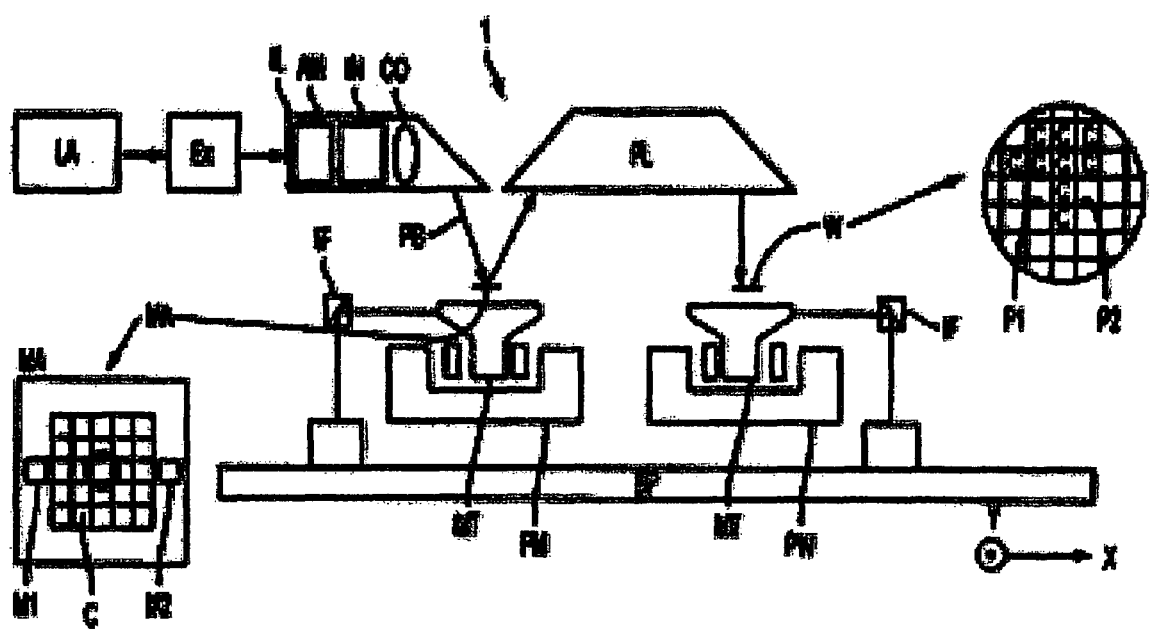
FIG. 6 schematically depicts a lithographic projection apparatus suitable for use with a mask designed with the aid of the current invention.

FIG. 6 schematically depicts a lithographic projection apparatus suitable for use with a mask designed with the aid of the current invention. The apparatus comprises:

a radiation system Ex, IL, for supplying a projection beam PB of radiation. In this particular case, the radiation system also comprises a radiation source LA;

a first object table (mask table) MT provided with a mask holder for holding a mask MA (e.g., a reticle), and connected to first positioning means for accurately positioning the mask with respect to item PL;

a second object table (substrate table) WT provided with a substrate holder for holding a substrate W (e.g., a resist-coated silicon wafer), and connected to second positioning means for accurately positioning the substrate with respect to item PL;

a projection system ("lens") PL (e.g., a refractive, catoptric or catadioptric optical system) for imaging an irradiated portion of the mask MA onto a target portion C (e.g., comprising one or more dies) of the substrate W.

As depicted herein, the apparatus is of a transmissive type (i.e., has a transmissive mask). However, in general, it may also be of a reflective type, for example (with a reflective mask). Alternatively, the apparatus may employ another kind of patterning means as an alternative to the use of a mask; examples include a programmable mirror array or LCD matrix.

The source LA (e.g., a mercury lamp or excimer laser) produces a beam of radiation. This beam is fed into an illumination system (illuminator) IL, either directly or after having traversed conditioning means, such as a beam expander Ex, for example. The illuminator IL may comprise adjusting means AM for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam PB impinging on the mask MA has a desired uniformity and intensity distribution in its cross-section.

It should be noted with regard to FIG. 6 that the source LA may be within the housing of the lithographic projection apparatus (as is often the case when the source LA is a mercury lamp, for example), but that it may also be remote from the lithographic projection apparatus, the radiation beam that it produces being led into the apparatus (e.g., with the aid of suitable directing mirrors); this latter scenario is often the case when the source LA is an excimer laser (e.g., based on KrF, ArF or $F_2$ lasing). The current invention encompasses at least both of these scenarios.

The beam PB subsequently intercepts the mask MA, which is held on a mask table MT. Having traversed the mask MA, the beam PB passes through the lens PL, which focuses the beam PB onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the mask MA with respect to the path of the beam PB, e.g., after mechanical retrieval of the mask MA from a mask library, or during a scan. In general, movement of the object tables MT, WT will be realized with the aid of a long-stroke module (coarse positioning) and a short-stroke module (fine positioning), which are not explicitly depicted in FIG. 6. However, in the case of a wafer stepper (as opposed to a step-and-scan tool) the mask table MT may just be connected to a short stroke actuator, or may be fixed.

The depicted tool can be used in two different modes:

In step mode, the mask table MT is kept essentially stationary, and an entire mask image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the mask table MT is movable in a given direction (the so-called "scan direction", e.g., the y direction) with a speed v, so that the projection beam PB is caused to scan over a mask image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

The concepts disclosed herein may simulate or mathematically model any generic imaging system for imaging sub wavelength features, and may be especially useful with emerging imaging technologies capable of producing wavelengths of an increasingly smaller size. Emerging technologies already in use include EUV (extreme ultra violet) lithography that is capable of producing a 193 nm wavelength with the use of a ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range. Because most materials are absorptive within this range, illumination may be produced by reflective mirrors with a multi-stack of Molybdenum and Silicon. The multi-stack mirror has a 40 layer pairs of Molybdenum and Silicon where the thickness of each layer is a quarter wavelength. Even smaller wavelengths may be produced with X-ray lithography. Typically, a synchrotron is used to produce an X-ray wavelength. Since most material is absorptive at x-ray wavelengths, a thin piece of absorbing material defines where features would print (positive resist) or not print (negative resist).

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

Software functionalities of the processor 1000 involve programming, including executable code, are used to implement the above described method of determining optimal DOE for different lithography systems. The software code is executable by the general-purpose computer. In operation, the code and possibly the associated data records are stored within a general-purpose computer platform. At other times, however, the software may be stored at other locations and/or transported for loading into the appropriate general-purpose computer systems. Hence, the embodiments discussed above involve one or more software products in the form of one or more modules of code carried by at least one machine-readable medium. Execution of such code by a processor of the computer system enables the platform to implement the catalog and/or software downloading functions, in essentially the manner performed in the embodiments discussed and illustrated herein.

As used herein, terms such as computer or machine "readable medium" refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in any computer(s) operating as one of the server platform, discussed above. Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, less commonly used media such as punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

It is also noted that variations of the foregoing embodiments of the present invention are also possible. As already mentioned, while the embodiments disclosed above illustrate the present invention being utilized in conjunction with an eigen decomposition model, it can also be utilized with other types of model simulators.

In addition, the step of verifying whether or not the features of a target mask are within the operational window of the model can be performed before and/or after OPC treatment has been performed on the mask pattern. In other words, the process of the present invention can be utilized to confirm whether the target mask modified to include OPC features is within the operational window.

Further, while the foregoing description indicates that the process is performed on all of the features contained in the mask pattern, it is also possible to selectively identify features or categories of features that should be checked to determine if these features fall within the operational window of the model. For example, the process may be limited to only those features in the mask pattern deemed critical by the mask designer.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A method for modeling a photolithography process comprising the steps of:

generating a calibrated model of said photolithography process, said calibrated model capable of estimating an image to be produced by said photolithography process when utilized to image a mask pattern containing a plurality of features;

determining an operational window of said calibrated model, said operational window defining if said calibrated model can accurately estimate the image to be produced by a given feature in said mask pattern, comparing said plurality of features of said mask pattern to said operational window of said calibrated model, and identifying said plurality of features of said mask pattern that are not within the operational window of said calibrated model.

2. The method of claim 1, wherein said step of generating a calibrated model comprises the steps of:

defining an imaging system and processing conditions to be utilized in said photolithography process;

generating an initial model of said system and processing conditions of said photolithography process;

defining a plurality of test structures;

imaging the test structures utilizing said imaging system and processing conditions of said photolithography process to obtain actual imaging results;

generating simulated imaging results by subjecting said test structures to said model;

comparing said simulated imaging results to said actual imaging results; and adjusting said initial model such that the difference between said simulated imaging results and said actual imaging results is less than a predefined criteria, wherein said adjusted initial model corresponds to said calibrated model.

3. The method of claim 2, wherein said initial model and said calibrated model utilize eigen functions to represent said photolithography process.

4. The method of claim 2, wherein said comparing said simulated imaging results to said actual imaging results utilizes two-dimensional contour patterns in the comparison process.

5. A computer readable medium configured to store program instructions for execution by at least one programmable computer, wherein execution of the program instructions by at least one programmable computer causes the at least one programmable computer to perform a sequence of steps for modeling a photolithography process, said sequence of steps comprising:

generating a calibrated model of said photolithography process, said calibrated model capable of estimating an image to be produced by said photolithography process when utilized to image a mask pattern containing a plurality of features;

determining an operational window of said calibrated model, said operational window defining if said calibrated model can accurately estimate the image to be produced by a given feature in said mask pattern, comparing said plurality of features of said mask pattern to said operational window of said calibrated model, and identifying said plurality of features of said mask pattern that are not within the operational window of said calibrated model.

6. The computer readable medium of claim 5, wherein said step of generating a calibrated model comprises the steps of:

defining an imaging system and processing conditions to be utilized in said photolithography process;

generating an initial model of said system and processing conditions of said photolithography process;

defining a plurality of test structures;

imaging the test structures utilizing said imaging system and processing conditions of said photolithography process to obtain actual imaging results;

generating simulated imaging results by subjecting said test structures to said model;

comparing said simulated imaging results to said actual imaging results; and adjusting said initial model such that the difference between said simulated imaging results and said actual imaging results is less than a predefined criteria, wherein said adjusted initial model corresponds to said calibrated model.

7. The computer readable medium of claim 6, wherein said initial model and said calibrated model utilize eigen functions to represent said photolithography process.

8. The computer readable medium of claim 5, wherein said comparing said simulated imaging results to said actual imaging results utilizes two-dimensional contour patterns in the comparison process.

9. An apparatus for modeling a photolithography process, said apparatus comprising:

means for generating a calibrated model of said photolithography process, said calibrated model capable of estimating an image to be produced by said photolithography process when utilized to image a mask pattern containing a plurality of features;

means for determining an operational window of said calibrated model, said operational window defining if said calibrated model can accurately estimate the image to be produced by a given feature in said mask pattern, means for comparing said plurality of features of said mask pattern to said operational window of said calibrated model, and means for identifying said plurality of features of said mask pattern that are not within the operational window of said calibrated model.

10. The apparatus of claim 9, wherein said means for generating a calibrated model comprises:

means for defining an imaging system and processing conditions to be utilized in said photolithography process;

means for generating an initial model of said system and processing conditions of said photolithography process;

means for defining a plurality of test structures;

means for imaging the test structures utilizing said imaging system and processing conditions of said photolithography process to obtain actual imaging results;

means for generating simulated imaging results by subjecting said test structures to said model;

means for comparing said simulated imaging results to said actual imaging results; and means for adjusting said initial model such that the difference between said simulated imaging results and said actual imaging results is less than a predefined criteria, wherein said adjusted initial model corresponds to said calibrated model.

11. The apparatus of claim 10, wherein said initial model and said calibrated model utilize eigen functions to represent said photolithography process.

12. The apparatus of claim 10, wherein said comparing said simulated imaging results to said actual imaging results utilizes two-dimensional contour patterns in the comparison process.

* * * * *